(12) United States Patent
Schwartz

(10) Patent No.: US 8,661,838 B2
(45) Date of Patent: Mar. 4, 2014

(54) CENTRAL VACUUM COOLING PLANT

(75) Inventor: Louis Schwartz, Northampton, PA (US)

(73) Assignee: FLSmidth A/S (DK)

( * ) Notice: Subject to any disclaimer, the term of this patent is extended or adjusted under 35 U.S.C. 154(b) by 770 days.

(21) Appl. No.: 12/794,827

(22) Filed: Jun. 7, 2010

(65) Prior Publication Data

US 2011/0300278 A1    Dec. 8, 2011

(51) Int. Cl.
*F25B 19/00* (2006.01)

(52) U.S. Cl.
USPC .............................................. 62/100; 62/169

(58) Field of Classification Search
USPC ............ 62/100, 169, 170, 231, 268; 426/472, 426/392, 524, 327; 99/472, 454
See application file for complete search history.

(56) References Cited

U.S. PATENT DOCUMENTS 2,904,441 A * 9/1959 Grindrod ...................... 426/412
3,795,085 A * 3/1974 Andre et al. .................... 53/512
4,340,111 A * 7/1982 Skala ............................... 165/61
5,960,736 A * 10/1999 Ludington et al. .......... 119/14.08
2005/0214108 A1* 9/2005 Hayes ............................. 415/90

* cited by examiner

*Primary Examiner* — Mohammad M Ali
(74) *Attorney, Agent, or Firm* — Daniel DeJoseph; Aaron M. Pile; Jeffrey A. Sharp

(57) ABSTRACT

Described is a method as well as an apparatus for vacuum cooling of food produce through moisture removal, which method comprising the steps of loading the food produce to be cooled into a vacuum chamber, lowering the pressure inside the vacuum chamber to a predetermined pressure level and maintaining the vacuum chamber at this predetermined pressure level both by removing air through a vacuum pump system for a sufficient time to allow heat transfer out of the food produce to take place, and condensing water vapor inside the vacuum chamber through a refrigeration system. The method and apparatus is unique in that the step of lowering the pressure inside the vacuum chamber to the predetermined pressure level is carried out using a single stage vacuum pump and the step of maintaining the vacuum chamber at this predetermined pressure level is carried out using a two stage vacuum pump.

8 Claims, 3 Drawing Sheets

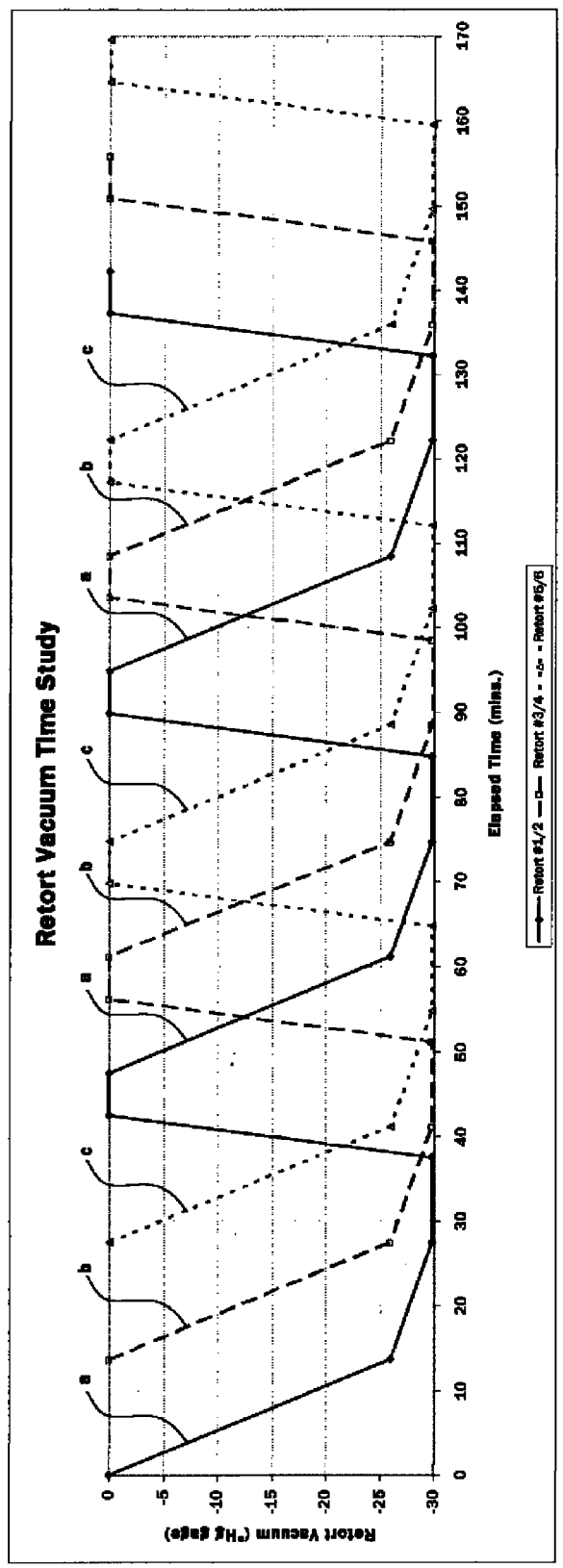

CENTRAL VACUUM COOLING PLANT

The present invention relates to a method for vacuum cooling of produce through moisture removal, which method comprising the steps of loading the produce to be cooled into a vacuum chamber, also know as a "retort", lowering the pressure inside the vacuum chamber to a predetermined pressure level and maintaining the vacuum chamber at this predetermined pressure level both by removing air through a vacuum pump system for a sufficient of time to allow heat transfer out of the produce to take place, and condensing water vapor inside the vacuum chamber through a refrigeration system. This may be done in a two or more, and preferable a three, step process typically utilizing separate vacuum pumps in each step. Further, the invention relates to a vacuum cooling apparatus.

BACKGROUND OF THE INVENTION

Vacuum cooling is a well known and proven cooling method within the fresh food produce industry. The method is widely used for cooling fresh produce from temperatures of up to about 30° C. (85° F.) to storage temperature of about 2° C. (35° F.) within very short time. Because the cooling method relies on latent heat of vaporization of water at low pressure in order to effect the cooling of the produce, the method is often combined with the addition of water. The refrigeration system may comprise a number of refrigeration coils placed inside the vacuum chamber which coils condense the vapor back into water, thereby making the process to work more efficiently and preventing water vapor to be carried over to the vacuum pump system. Until the present invention, vacuum cooling systems typically use a fixed speed two stage vacuum pump, e.g. of the rotary sliding vane type, for lowering the pressure and maintaining the lowered pressure inside the vacuum chamber, which is alternatively referred to in the industry as the "bounce" point. Often the two stage vacuum pumps used are somewhat undersized for the first pressure lowering step, but oversized for the second pressure maintaining step. Because the two stages of the pumps are directly coupled together, the high pressure stage is still being rotated during the pressure lowering step even though it is only the low pressure stage of the pumps that is functioning. This entails higher energy consumption than theoretical necessary, a fact which is supported by practical experience showing that less than 10% of the vacuum pump volumetric capacity is used during the pressure maintaining step, but the entire vacuum pump continues to run at full speed.

The object of the present invention is to provide a method as well as an apparatus for vacuum cooling of produce through moisture removal, by which the above disadvantage is eliminated or at least significantly reduced.

DESCRIPTION OF THE INVENTION

This object is obtained by a method according to the introduction, one embodiment of which being that the steps in the process of lowering and maintaining the pressure at the desired level are achieved using at least two, and most preferably three, separate vacuum pumps—typically one for each step.

In the present invention the initial step of lowering the pressure inside the vacuum chamber to the predetermined minimum pressure level is carried out using a single stage vacuum pump and the step of maintaining the vacuum chamber at this predetermined minimum pressure level is carried out using a two stage vacuum pump.

Hereby is obtained a significant energy saving, which mainly is caused by splitting up the pressure lowering and maintaining steps into at least two, and more preferably three, distinct phases in which specifically sized vacuum pumps are used to most efficiently draw the required vacuum during the cooling process. Thus, in a three step plant a single stage vacuum pump may used for the first, fast pressure lowering step in which the pressure is lowered down to approximately −25" Hg (gage) point. In the second, the pressure is lowered from the intermediate pressure of approximately −25" Hg (gage) to a minimum or "bounce" point (typically about 4.5 mm Hg absolute pressure) using a medium, typically two stage vacuum pump. In the third step, minimum power consumption is needed to maintain vacuum level at the bounce point in the retort. In this step, typically but not always the longest part of the overall cooling cycle, the bounce point is maintained using a small vacuum pump, using minimum power consumption to maintain the vacuum level in the retort.

The first step accordingly will not utilize a vacuum pump having a high pressure stage that is idling during this step, meaning there is a net power saving or alternatively an increase in performance. Further, in the bounce step a two stage vacuum pump may be used to maintain the pressure in the vacuum chamber for the required duration. The vacuum pump in this step may be very small having very low displacement and thus low power consumption. It is assumed that the power consumption during this step may be lowered by about 75%. In addition, splitting up the pressure lowering and maintaining steps into at least two distinct phases, as described, makes it possible to operate more vacuum chambers simultaneously in any combination, i.e. where some vacuum chambers are in the pressure lowering step others may be in the pressure maintaining step.

In a two step process, as the working characteristic of the single stage vacuum pump varies over its working range from atmospheric pressure down to approximately −25" Hg gauge, as opposed to from approximately −25" Hg gauge to the bounce step, it is optional, but not necessarily preferred, to use a two stage vacuum pump.

Of course, the step of lowering the pressure inside the vacuum chamber may be performed using more than one single stage vacuum pumps and/or two stage vacuum pumps, where each of the vacuum pumps is especially designed for optimum operation within each their working range. In this way each vacuum pump will always operate within a working range where it has its highest performance.

In order to further enhance the power savings and to prevent having to execute multiple warm starts in a day it is preferred that the vacuum pumps may be driven at variable speed using variable speed drives or alternatively that the vacuum pumps may be temporally disconnected from the drive by a suitable mechanical means such as a clutch (not shown).

The apparatus according to the invention for vacuum cooling of food produce through moisture removal comprises a vacuum chamber for containing the food produce to be cooled, a vacuum pump system for, by removing air from the vacuum chamber, lowering the pressure inside the vacuum chamber to a predetermined pressure level and maintaining the vacuum chamber at this predetermined pressure level for a sufficient amount of time to allow heat transfer out of the food produce to take place, and a refrigeration system for condensing water vapor inside the vacuum chamber and being characterized in that the vacuum pump system comprises a single stage vacuum pump for lowering the pressure inside the vacuum chamber to the predetermined pressure level and a two stage vacuum pump for maintaining the vacuum chamber at this predetermined pressure level. The amount of time sufficient to allow heat transfer out of the food producer to take place will depend on the specific produce being cooled.

In one embodiment of the invention the vacuum pump system may comprise a single stage vacuum pump for lowering the pressure from atmospheric pressure to a preselected pressure value and a two stage vacuum pump for the remaining pressure lowering.

In another embodiment of the invention the vacuum pump system may comprise a first single stage vacuum pump for lowering the pressure from atmospheric pressure to an intermediate pressure, a second single stage vacuum pump for lowering the pressure from the intermediate pressure value to a preselected pressure value and a two stage vacuum pump for the remaining at the preselected pressure value.

The vacuum pump system may comprise more than one single stage vacuum pumps and/or two stage vacuum pumps for lowering the pressure inside the vacuum chamber, where each of the vacuum pumps is especially designed for optimum operation within each their working range.

Further, the apparatus according to the invention for vacuum cooling of food produce through moisture removal may comprise more vacuum chambers which are operated simultaneously in any combination.

In addition, the apparatus may comprise variable speed drives for driving the vacuum pumps at variable speed. Alternatively, the apparatus may comprise means for temporally disconnecting each vacuum pump from its drive.

DESCRIPTION OF THE DRAWINGS

The invention will now be explained in further details with reference to the drawings, in which:

FIGS. 2 and 3 depict examples of time studies showing how the three step system of the present invention can be used to run multiple retorts, in the depicted example six, in a cyclical fashion.

DETAILED DESCRIPTION OF THE INVENTION

Figure 1:
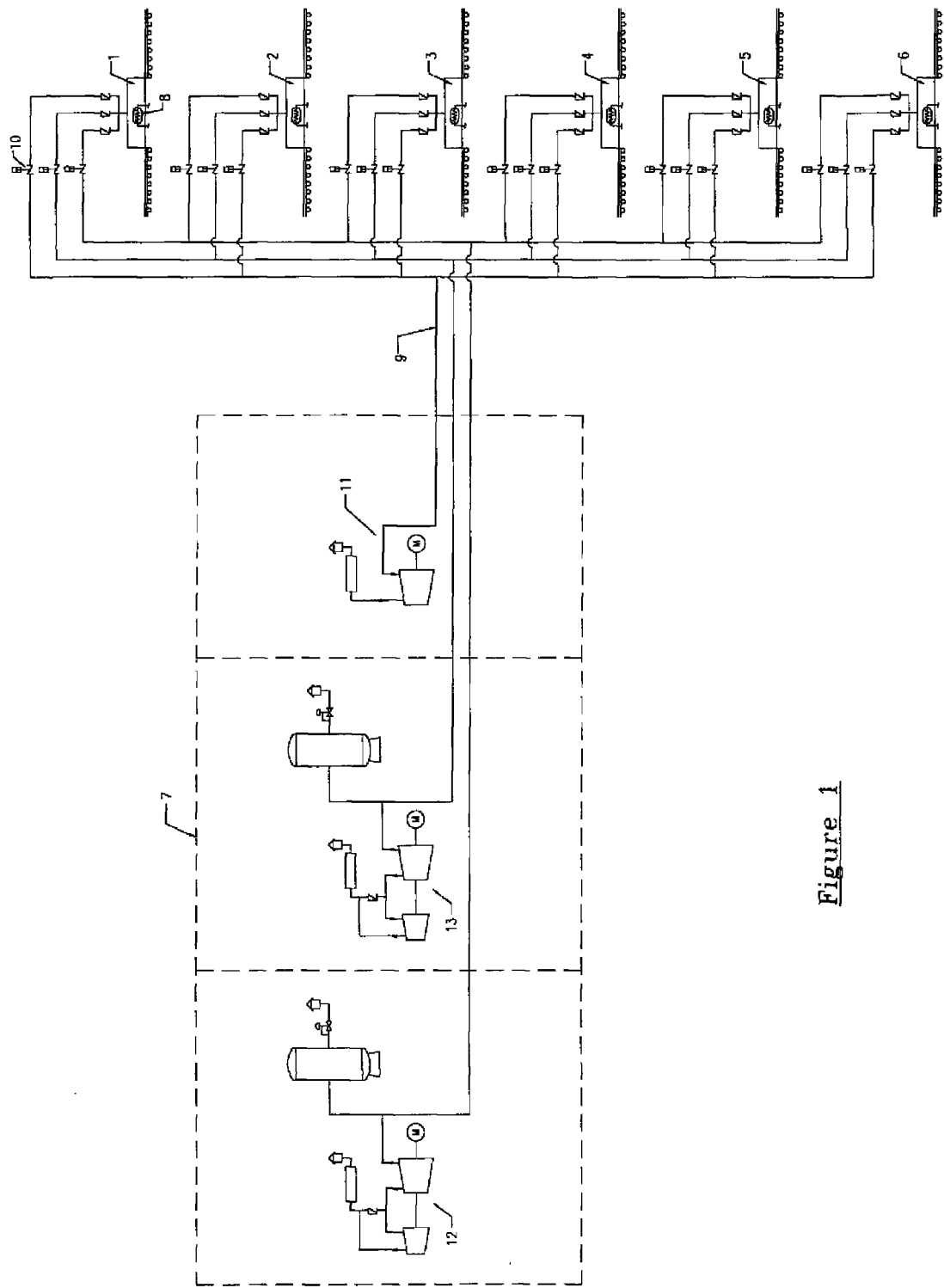
FIG. 1 shows a diagram of an apparatus according to the invention.

In FIG. 1 there is seen a diagram of an apparatus according to the invention, which apparatus comprises a plurality (in this depicted example there are six) of vacuum chambers 1-6 for containing and cooling the produce (not shown), and a vacuum pump system 7 for, by removing air from each of the vacuum chambers 1-6, lowering the pressure inside each of the vacuum chambers 1-6 to a predetermined pressure level and maintaining the vacuum chamber at this predetermined pressure level for a sufficient amount of time to allow heat transfer out of the food produce to take place. Further, the apparatus comprises a refrigeration system 8 for condensing water vapor inside each of the vacuum chambers 1-6. The vacuum pump system 7 is connected to each of the vacuum chambers 1-6 by means of a pipe system 9 having appropriate valve means 10 for opening and closing the different pipes in the pipe system in a desired manner.

The embodiment in FIG. 1 is a three step system. In order mainly to reduce the power consumption the vacuum pump system 7 comprises in accordance to the invention a single stage vacuum pump 11 for lowering the pressure inside each of the vacuum chambers 1-6 to a preselected intermediate pressure, a first two stage vacuum pump 13 for lowering the pressure inside each of the vacuum chambers 1-6 from the preselected intermediate pressure to the final predetermined "bounce" pressure level and a two stage vacuum pump 12 for maintaining each of the vacuum chambers 1 at the final predetermined pressure level.

Thus, in the shown embodiment, the step of lowering the pressure inside the vacuum chambers 1-6 to the predetermined pressure level to be prevailing during the pressure maintaining step is carried out in a two step process using first the single stage vacuum pump 11 for lowering the pressure from atmospheric pressure to a preselected pressure value and then the two stage vacuum pump 13 for the remaining pressure lowering.

The vacuum pump system 7 may comprise more single stage vacuum pumps 11 and/or more two stage vacuum pumps 13 for lowering the pressure inside the vacuum chamber, where each of the vacuum pumps is especially designed for optimum operation within each their working range. Further, the vacuum pump system 2 may comprise more two stage vacuum pumps 7 for the pressure maintaining step.

Figure 2:
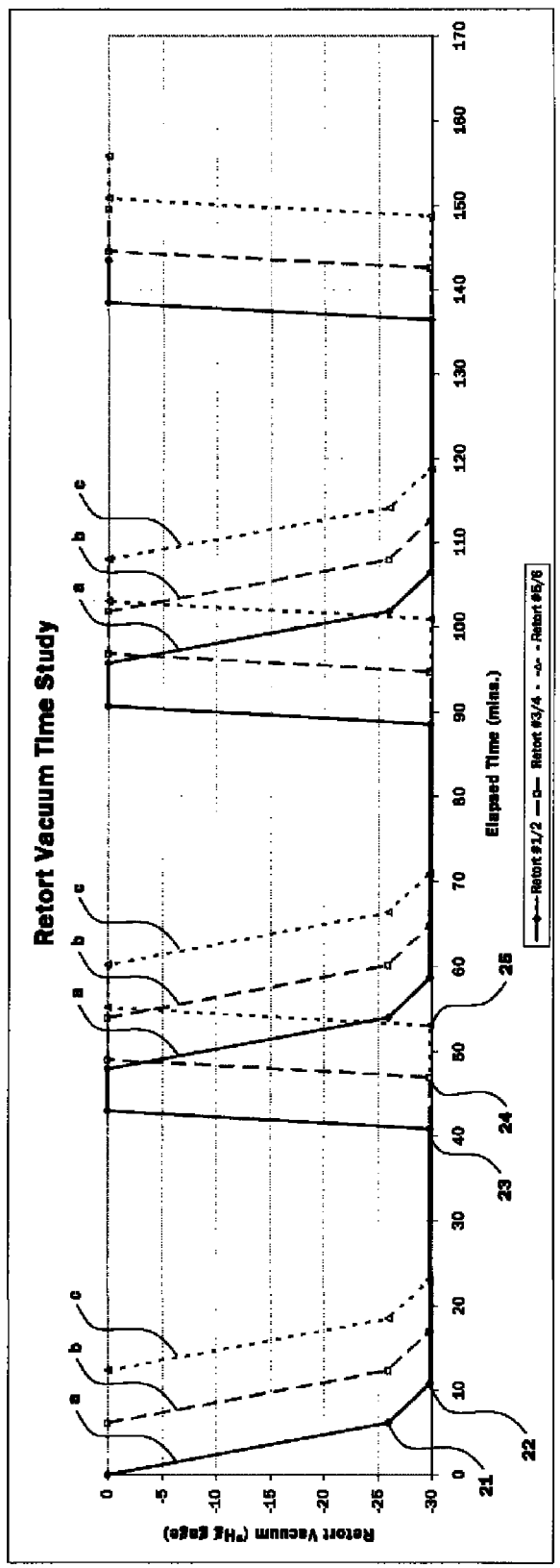

In FIGS. 2 and 3 there are depicted examples of time studies showing how the three step system of the present invention can be used to run multiple retorts, in the depicted example six, with a particular pump handling two retorts at the same time. Thus, each individual curve a, b and c illustrates the pressure time cycles for the respective retorts 1 and 2, 3 and 4, and 5 and 6.

For example, with reference to FIG. 2, the cycle begins at the far left of the graft. Curve a shows a time pressure study for retorts 1 and 2. It can be seen that retorts 1 and 2 will take approximately 6 minutes to be reduced from a pressure of 0" Hg (gage) to about −26" Hg (gage) (the first step, the end point of which is indicated by numeral 21), an additional approximate 4 minutes to reduce further to the final bounce pressure of about −30" Hg (gage) (the second step, the end point of which is indicated by numeral 22), where it will be maintained for about 30 minutes (the third step, the end point of which is indicated by numeral 23. As each step uses a separate vacuum pump, when the respective step is concluded the corresponding vacuum pump (11 in FIG. 1 for the first step, for instance) is "released" and can shortly thereafter start the equivalent step of the process on each succeeding group of retorts—for example, retorts 3 and 4 as exemplified by curve b, and thereafter on retorts 4 and 5 as exemplified by curve c. At the end of a respective three step process the retorts will be brought back to 0" Hg (gage) at which they will be maintained while the cooled produce is removed form the retorts and another batch of produce to be cooled is loaded into the retorts. Each type of produce treated by the present invention will have a different time profile. For example, in the profile exemplified in FIG. 3, the retorts will take approximately 13 minutes to be reduced from a pressure of 0" Hg (gage) to about −27" Hg (gage) (the first step), an additional approximate 15 minutes to reduce further to the final bounce pressure of about −30" Hg (gage) (the second step), where it will be maintained for about 10 minutes.

The invention claimed is:

1. An apparatus for vacuum cooling of food produce through moisture removal comprising at least one vacuum chamber for containing the food produce to be cooled, a vacuum pump system for, by removing air from the vacuum chamber, lowering the pressure inside the at least one vacuum chamber to a predetermined final pressure level and maintaining the at least one vacuum chamber at this predetermined final pressure level for a sufficient of time to allow heat transfer out of the food produce to take place, wherein the vacuum pump system comprises (i) at least one single stage intermediate pressure vacuum pump for lowering the pressure from atmospheric pressure to a intermediate preselected pressure value, (ii) at least one final pressure vacuum pump for the pressure lowering from the intermediate preselected pressure value to the predetermined final pressure level, and (iii) at least one pressure maintaining vacuum pump to maintain the at least one vacuum chamber at the predetermined final pressure level for a preselected time period.

2. An apparatus for vacuum cooling of food produce through moisture removal as claimed in claim 1, wherein the vacuum pump system comprises more than one single stage vacuum pumps and/or two stage vacuum pumps for lowering the pressure inside the at least one vacuum chamber to the final pressure level, where each of the vacuum pumps is especially designed for optimum operation within each of their working range.

3. An apparatus for vacuum cooling of food produce through moisture removal as claimed in claim 1, wherein the apparatus for vacuum cooling of food produce through moisture removal comprises a plurality of vacuum chambers, which are operated simultaneously in any combination.

4. An apparatus for vacuum cooling of food produce through moisture removal as claimed in claim 1, wherein the apparatus for vacuum cooling of food produce through moisture removal comprises variable speed drives for driving the vacuum pumps at variable speed.

5. An apparatus for vacuum cooling of food produce through moisture removal as claimed in claim 4, wherein the apparatus for vacuum cooling of food produce through moisture removal comprises means for temporally disconnecting each vacuum pump from its drive.

6. An apparatus for vacuum cooling of food produce through moisture removal as claimed in claim 3, wherein the plurality of vacuum chambers comprises a first set of vacuum chambers and a second set of vacuum chambers, each set of vacuum chambers containing one or two vacuum chambers, and wherein the apparatus further comprises
    (i) means for disconnecting the intermediate pressure vacuum pump from the first set of vacuum chambers after the pressure in the first set of vacuum chambers has reached the preselected intermediate pressure; and
    (ii) means for connecting the intermediate pressure vacuum pump to the second set of vacuum chambers to commence lowering the pressure in the second set of vacuum chambers from atmospheric pressure to the preselected intermediate pressure at approximately the same time that the final pressure vacuum pump commences lowering the pressure in the first set of vacuum chambers from the preselected intermediate pressure to the preselected final pressure.

7. An apparatus for vacuum cooling of food produce through moisture removal as claimed in claim 6, further comprising
    (iii) means for disconnecting the final pressure vacuum pump from the first set of vacuum chambers after the pressure in the first set of vacuum chambers has reached the preselected final pressure; and
    (iv) means for connecting the final pressure vacuum pump to the second set of vacuum chambers to commence lowering the pressure in the second set of vacuum chambers from the preselected intermediate pressure to the preselected final pressure at approximately the same time that the pressure maintaining vacuum pump commences maintaining the pressure in the first set of vacuum chamber at the predetermined final pressure level.

8. An apparatus for vacuum cooling of food produce through moisture removal as claimed in claim 7, further comprising
    (v) means for disconnecting the pressure maintaining vacuum pump from the first set of vacuum chambers after the pressure in the first set of vacuum chambers has been maintained at the preselected final pressure for a preselected time period; and
    (iv) means for connecting the pressure maintaining vacuum pump to the second set of vacuum chambers to commence maintaining the pressure in the second set of vacuum chamber at the predetermined final pressure level.

* * * * *